Figure 4:
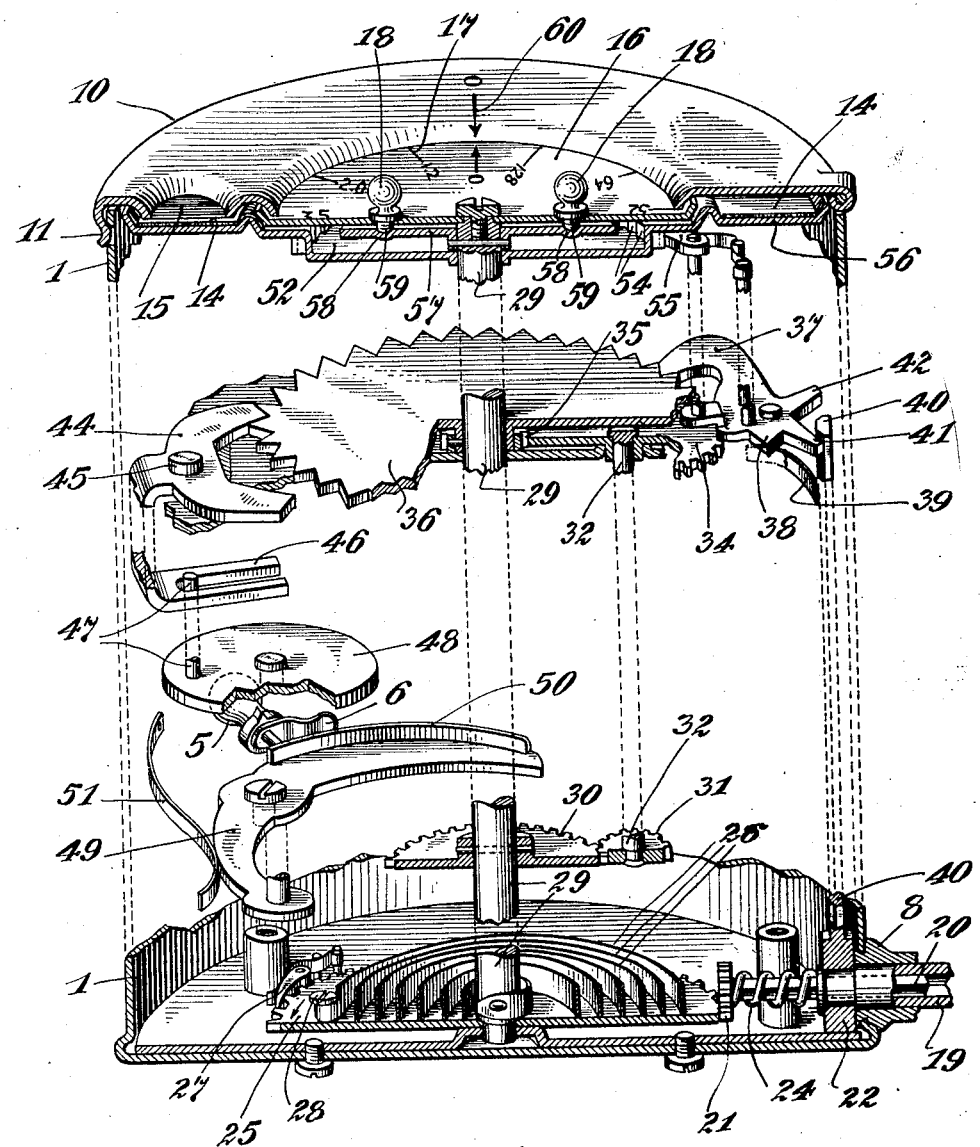
Figure 2:
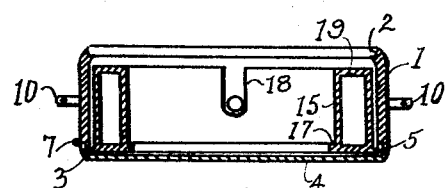
Figure 4:
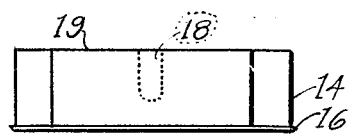
Figure 1:
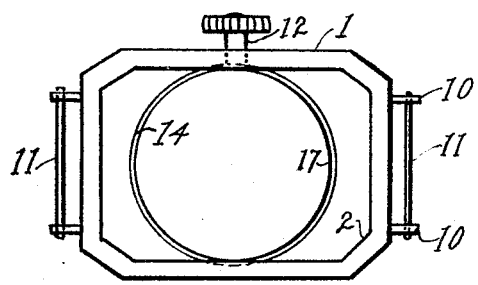
Figure 3:
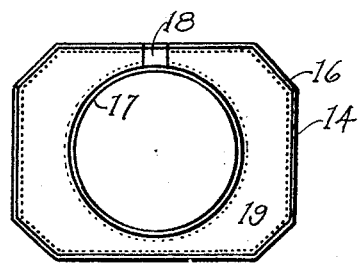
Figure 5:
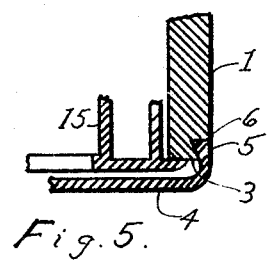

Nov. 29, 1927.
G. RAMSEY
1,651,151
EXPOSURE METER
Filed Oct. 14, 1926   3 Sheets-Sheet 1
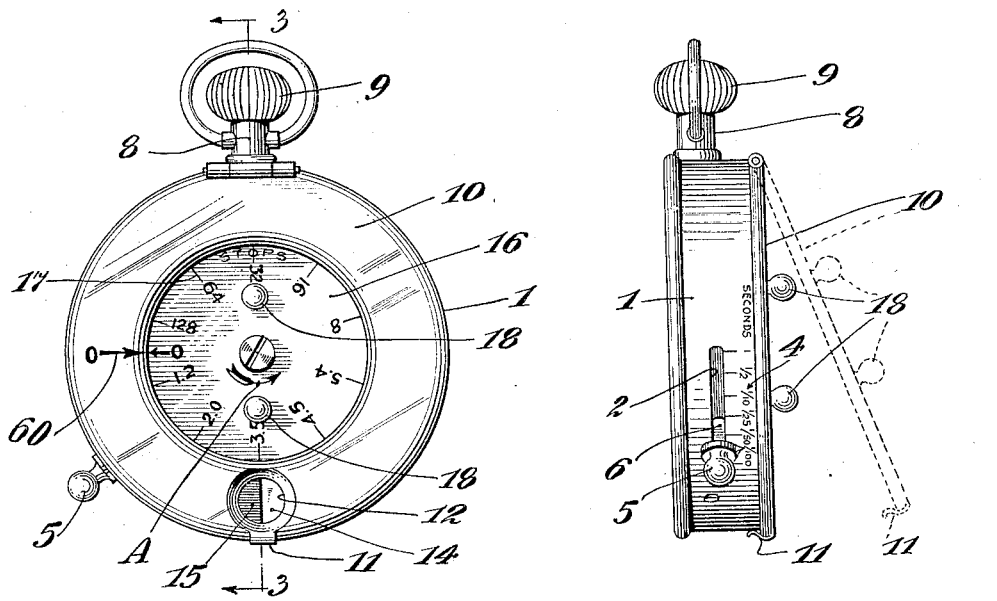
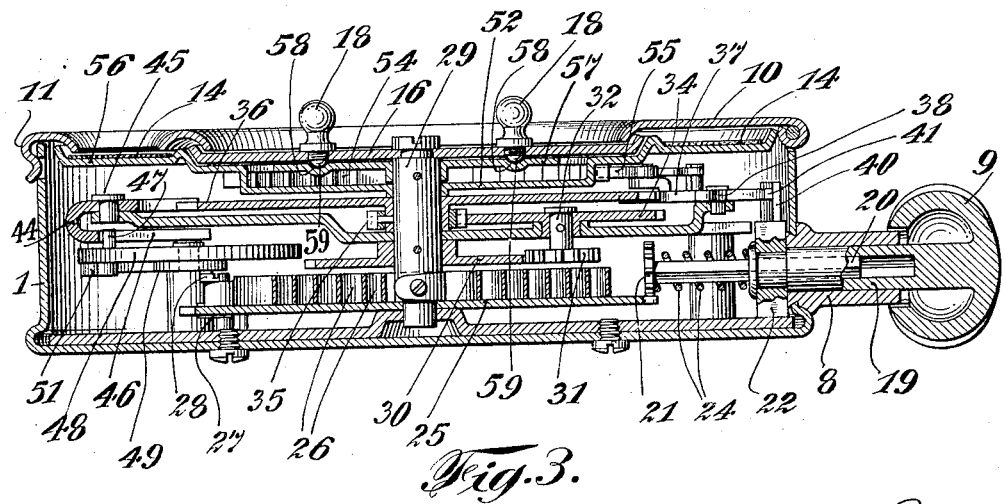

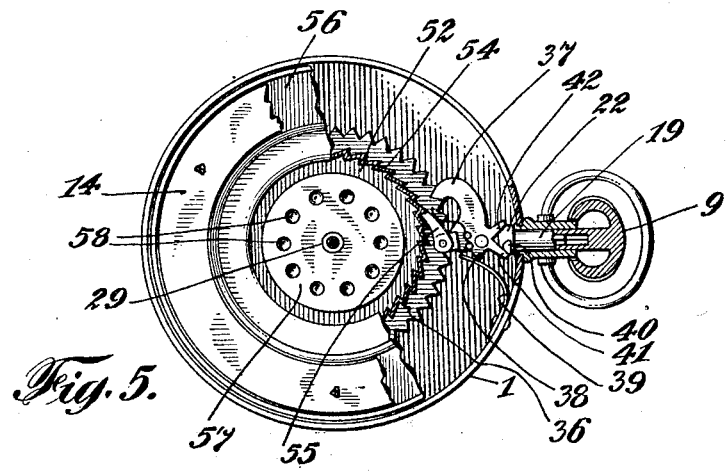
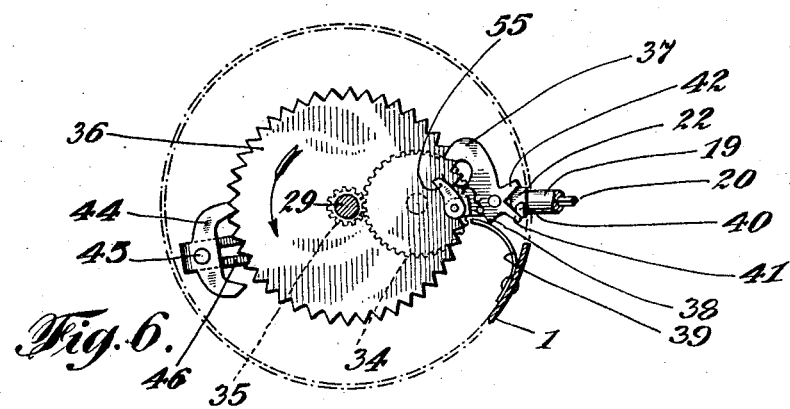
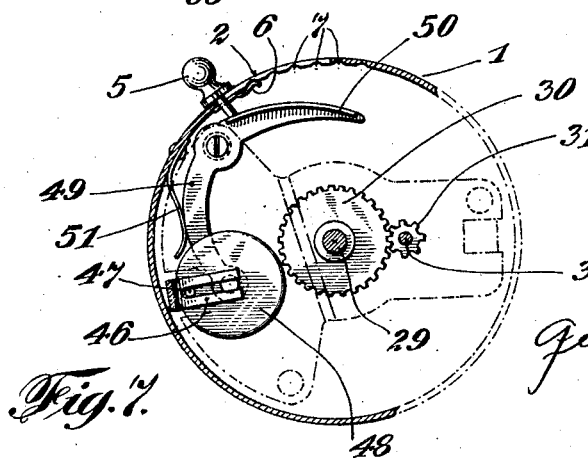

Patented Nov. 29, 1927.

1,651,151

UNITED STATES PATENT OFFICE.

GEORGE RAMSEY, OF BROOKLYN, NEW YORK.

EXPOSURE METER.

Application filed October 15, 1926. Serial No. 141,157.

The present invention relates broadly to photography and more especially to an exposure meter for automatically determining correct shutter speed and diaphragm opening.

The present invention relates to exposure meters of the actinic type in which a portion of the sensitized material is utilized for determining the photographic strength of the light by exposing a small portion of such material adjacent a comparative color index whereby the length of time for full plate exposure is determined by observing the time necessary for the exposed material to reach the same color tone or shade as the color index. The speed of discoloration of the sensitive member is relatively slow and bears a known relation to the speed of the plates being used.

The amount of light effective on a photographic plate of a predetermined speed, in a camera is determined largely by the size of the diaphragm opening and the length of the exposure, assuming a predetermined light condition. In the use of an actinic exposure meter, the time period necessary for the sensitive material to change to a predetermined color tone, to match the color index, is the indicating factor. Having determined this indicating factor, and assuming a certain shutter speed, then the correct diaphragm opening may be easily calculated; or assuming a predetermined diaphragm stop (which is represented by the largest number on the barrel) e. g., F. 128. This dial or indicator rotates in such a direction relative to the scale thereon as to bring F. 64, F. 32, F. 8, etc., successively past the indicating point as the dial rotates. The device is also provided with an indicating scale representing shutter speed and with an indicator adapted to be set at any predetermined shutter speed indicated on this scale. The setting of the shutter speed controls the rapidity of rotation of the diaphragm indicator.

The instrument may take the form of a watch case and its operation is analogous to that of a stop watch. Assuming the shutter indicator to be set at one-tenth of a second and with the zero of the diaphragm dial opposite the indicator on the face of the meter, the operator pushes the stem of the device, thereby exposing a portion of the sensitized material opposite a color chart and at the same time, releasing the driving mechanism which operates to slowly turn the diaphragm indicating dial. The operator watches the exposed actinic surface until it has assumed the same color as the color index. Then, the stem of the device is pushed a second time, which stops the driving mechanism. The operator then observes the number on the diaphragm dial which stands opposite the zero arrow and finds this number posure through a camera lens, and setting device for determining the rapidity of movement of said indicator.

4. In an exposure meter adapted to expose a portion of a light sensitive material, the combination of driving mechanism, a diaphragm scale, a moving indicator controlled by said driving mechanism and adapted to indicate diaphragm openings, a shutter scale, and setting device adjacent the shutter scale for determining the rapidity of movement of said indicator.

5. In an exposure meter adapted to expose a portion of light sensitive material, the combination of driving mechanism, a descending scale relative to diaphragm opening sizes, a diaphragm opening indicator driven by said mechanism to permit a reading to be taken on said scale, means to move the material step by step beneath an exposure opening, and means to control the speed of operation of said driving mechanism.

6. In an exposure meter adapted to expose a portion of light sensitive material, the combination of driving mechanism, a diaphragm opening indicator driven by said mechanism, means to control the speed of operation of said driving mechanism, and means under the control of the operator to start and stop said driving mechanism.

7. In an exposure meter adapted to expose a portion of light sensitive material, the combination of driving mechanism, a diaphragm opening indicator driven by said mechanism, means to control the speed of operation of said driving mechanism, means under the control of the operator to start and stop said driving mechanism, and devices to change the position of the light sensitive material for each period of operation of said driving mechanism.

8. In an exposure meter adapted to expose a portion of light sensitive material, the combination of means to carry the sensitive material, light sensitive material carried by said means, a driving mechanism, a dial operated by said driving mechanism, devices to start and stop said dial, and means to expose said light sensitive material when said dial is started.

9. In an exposure meter adapted to expose a portion of light sensitive material, the combination of a casing having an exposure opening, a rotatable support for the light sensitive material mounted beneath said opening, light sensitive material carried by said support, a driving mechanism, a rotatable indicator driven by said driving mechanism, means to start and stop the rotation of said indicator, and devices to move said support to bring a fresh portion of said sensitive material beneath said exposure opening when said indicator starts to rotate.

10. In an exposure meter adapted to expose a portion of light sensitive material, the combination of a casing having an exposure opening therein, a support for the light sensitive material, a rotatable indicator for indicating a factor of plate exposure through a camera lens, a driving mechanism comprising a pallet and a balance wheel cooperating therewith, and means to cause a relative movement between said pallet and said balance wheel to control the speed of operation of the driving mechanism in accordance with another factor of plate exposure through a camera lens.

11. In an exposure meter adapted to expose a light sensitive material, the combination of a casing, a movable indicator, a driving mechanism comprising a pallet and a balance wheel, means to vary the effect of said balance wheel upon said pallet in accordance with a factor of plate exposure through a camera lens, and devices to start and stop said movable indicator.

12. In an exposure meter adapted to expose a light sensitive material, the combination with a casing having an exposure opening therein, a support for the light sensitive material, means to expose the said material through said exposure opening, a driving mechanism, an indicator driven by said mechanism, and means to start and stop the movement of said indicator and to move the said support one step when the movement of the indicator is started.

13. In an exposure meter adapted for use with a light sensitive material, a casing having an exposure opening therein, means to support a ring of light sensitive material, a ring of light sensitive material carried by said support, means to cause the support to advance the said ring step by step beneath the exposure opening, a driving mechanism, an indicator driven by said mechanism and adapted to cooperate with a scale comprising indices of a factor of plate exposure through a camera lens, and devices to start said mechanism to operate when said support is moved one step.

14. An exposure meter comprising a movable support for sensitive material, sensitive material mounted on said support, devices to move said support step by step beneath said exposure opening, a scale comprising indices of a factor of plate exposure through a camera lens, driving mechanism, an indicator driven by said driving mechanism, and means to start and to stop said indicator at the will of the operator to enable a direct reading to be taken upon said scale to determine said factor, said means being operative upon said devices to move said support step by step.

GEORGE RAMSEY.

Nov. 29, 1927.

I. DINSTMAN

WATCHCASE

Filed May 4, 1925

1,651,194

Isidor Dinstman, Inventor

By his Attorney
Chas. W. Mortimer